(12) United States Patent
Williams

(10) Patent No.: US 7,190,087 B2
(45) Date of Patent: Mar. 13, 2007

(54) HYDROELECTRIC TURBINE AND METHOD FOR PRODUCING ELECTRICITY FROM TIDAL FLOW

(76) Inventor: Herbert L. Williams, 109 Rivere Edge Dr., East Palatka, FL (US) 32131

( * ) Notice: Subject to any disclaimer, the term of this patent is extended or adjusted under 35 U.S.C. 154(b) by 105 days.

(21) Appl. No.: 11/185,666

(22) Filed: Jul. 20, 2005

(65) Prior Publication Data

US 2007/0018459 A1 Jan. 25, 2007

(51) Int. Cl.
*F03B 13/00* (2006.01)
*F03B 7/00* (2006.01)

(52) U.S. Cl. .............................. 290/53; 290/54; 290/42
(58) Field of Classification Search .................. 290/42, 290/43, 44, 53, 54, 55; 415/148
See application file for complete search history.

(56) References Cited

U.S. PATENT DOCUMENTS

| | | | | |
|---|---|---|---|---|
| 3,986,787 A | * | 10/1976 | Mouton et al. ................. | 415/7 |
| 4,163,904 A | * | 8/1979 | Skendrovic ................... | 290/54 |
| 4,613,279 A | * | 9/1986 | Corren et al. ............. | 415/121.2 |
| 4,720,640 A | * | 1/1988 | Anderson et al. ............. | 290/43 |
| 6,104,097 A | * | 8/2000 | Lehoczky ..................... | 290/54 |
| 6,406,251 B1 | * | 6/2002 | Vauthier ........................ | 415/7 |
| 6,648,589 B2 | * | 11/2003 | Williams ....................... | 415/1 |
| 6,729,840 B2 | * | 5/2004 | Williams .................... | 415/3.1 |
| 6,806,586 B2 | * | 10/2004 | Wobben ....................... | 290/54 |
| 6,957,947 B2 | * | 10/2005 | Williams .................... | 415/4.3 |
| 6,995,479 B2 | * | 2/2006 | Tharp .......................... | 290/54 |
| 7,091,628 B1 | * | 8/2006 | Balt ............................. | 290/54 |
| 7,116,005 B2 | * | 10/2006 | Corcoran, III ............... | 290/43 |

* cited by examiner

*Primary Examiner*—Nicholas Ponomarenko
(74) *Attorney, Agent, or Firm*—Thomas C. Saitta

(57) ABSTRACT

A hydroelectric turbine for the production of electricity from tidal flow forces, the turbine having a rotor with an open center such that the blades are mounted between an inner rim and outer rim, where retaining members and anti-friction members are provided to prevent excessive movement of the rotor relative to the housing in either axial direction, such that water flow in either direction operates the turbine.

14 Claims, 3 Drawing Sheets

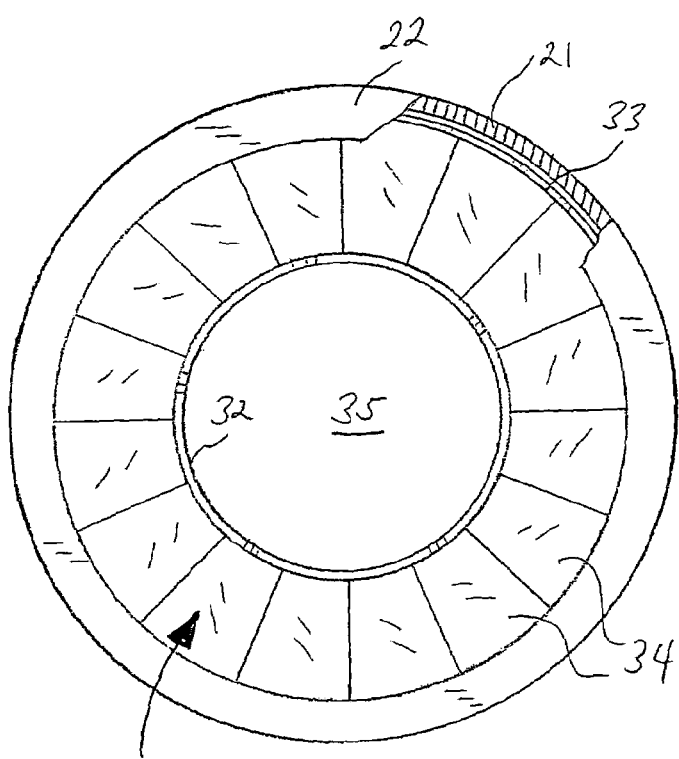
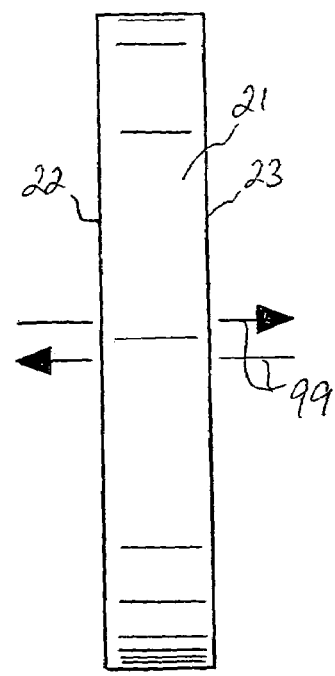
FIG. 1
FIG. 2

HYDROELECTRIC TURBINE AND METHOD FOR PRODUCING ELECTRICITY FROM TIDAL FLOW

BACKGROUND OF THE INVENTION

This invention relates generally to the field of turbines or power plants that produce electricity from fluid flow, either air or water, and more particularly relates to such devices wherein the fluid flow causes rotation of a propeller-type rotor, with the rotation being transferred to generators to produce the electricity.

Production of electricity using hydroelectric or wind-powered turbines is well known. The fluid flow causes rotation of a propeller-type rotor or blades. For wind-powered turbines, the devices are located in areas with steady air currents, and the devices are typically rotated so as to be oriented in the optimum direction for capturing the wind energy. For hydroelectric turbines, the devices are placed in fast moving water currents, typically as part of a dam structure. Such water flow conditions are known as high head conditions.

While most turbines are constructed to have a central rotating shaft onto which the blades or runners are mounted, it has been found that open-centered turbine constructions can have benefits not found with turbines having centralized shafts. Turbines having open-centered rotors, where the blades are mounted between inner and outer annular rings or rims and where the energy is transferred through the outer rim, can be successful in low head conditions, i.e., in slower currents. This is due to several reasons, including the fact that elimination of the central shaft and centralized blade portions reduces drag and the fact that larger diameter rotors can be produced since weight is reduced, thereby increasing the surface area contacting the low head flow. Another benefit to open-centered turbines in hydroelectric applications is that since water flow through the central portion of the turbine is not obstructed by blades, fish are able to pass through.

Examples of such open center turbines can be seen in my U.S. Pat. No. 5,592,816 issued Jan. 14, 1997, and reissued as RE38,336 on Dec. 2, 2003, U.S. Pat. No. 6,648,589 issued Nov. 18, 2003, U.S. Pat. No. 6,729,840 issued May 4, 2004, and U.S. Patent Appl. Publication US2005/0031442 published Feb. 10, 2005.

Because the fluid flow in these turbines is unidirectional, the force applied against the blades and rotors is also uni-directional. Thus, to date it has only been necessary to address frictional issues on the down-stream or down-wind side of the rotor where the outer rim is retained by the housing, since the flow will exert pressure in only one direction. In open-centered turbines it is the trailing edge of the outer rim that must be supported by the housing, while the leading edge of the outer rim is not subjected to down-stream or down-wind pressure.

It is an object of this invention to provide a hydroelectric turbine or power plant that is operational in bi-directional water flow without requiring physical reversal of the turbine, where bi-directional flow comprises flow in one direction over a certain time period and reversed flow in the opposite direction over a subsequent time period. It is a further object to provide such a turbine and its method of use in opposing bidirectional low head water flow conditions. It is a further object to provide such a turbine capable of producing electricity in bidirectional tidal flow applications and the method of extracting electrical power from tidal flow.

SUMMARY OF THE INVENTION

The invention is a device and method for the creation of electricity from a turbine operated by tidal flow or other bi-directional reversing water flow, where bi-directional water flow encompasses flow in a first direction over a first time period followed by flow in the opposite direction over a following time period, with this cycle continuing. Such water flow is typically a low head condition, in that the current or water movement is not fast flowing or concentrated.

The methodology comprises locating an open-centered hydroelectric turbine or power plant within the tidal flow, such that the bi-directional tidal flow operates the turbine and produces electricity with water flow in either direction without having to reverse the orientation of the turbine. The turbine comprises a rotor or rotating assembly defined by at least one set of rotating blades or similar propeller-type structures mounted within a stationary housing, the blades being disposed between an interior annular rim and an exterior annular rim, such that a relatively large open center is defined that contains no structure. The water flow imparts rotation to the rotor and this energy is transferred to one or more generators to create electricity, or the rotor and housing itself is constructed to operate as a generator, wherein for example magnets are located along the perimeter of the outer ring and coils are located along the perimeter of the housing encircling the outer rim.

In order to account for water flow in opposing directions, it is necessary to provide bearing or anti-friction means to reduce contract and friction between the outer rim and the annular retaining flanges of the housing in both the inflow and outflow directions. In the preferred embodiment, journals and marine bearing plates are utilized to minimize rotational friction between the edges of the outer rim and the retaining flanges of the housing.

BRIEF DESCRIPTION OF THE DRAWINGS

FIG. 1 is a view of the hydroelectric turbine as seen from the axial perspective.

FIG. 2 is a view of the hydroelectric turbine as seen perpendicularly to the axial direction.

DETAILED DESCRIPTION OF THE INVENTION

Figure 3:
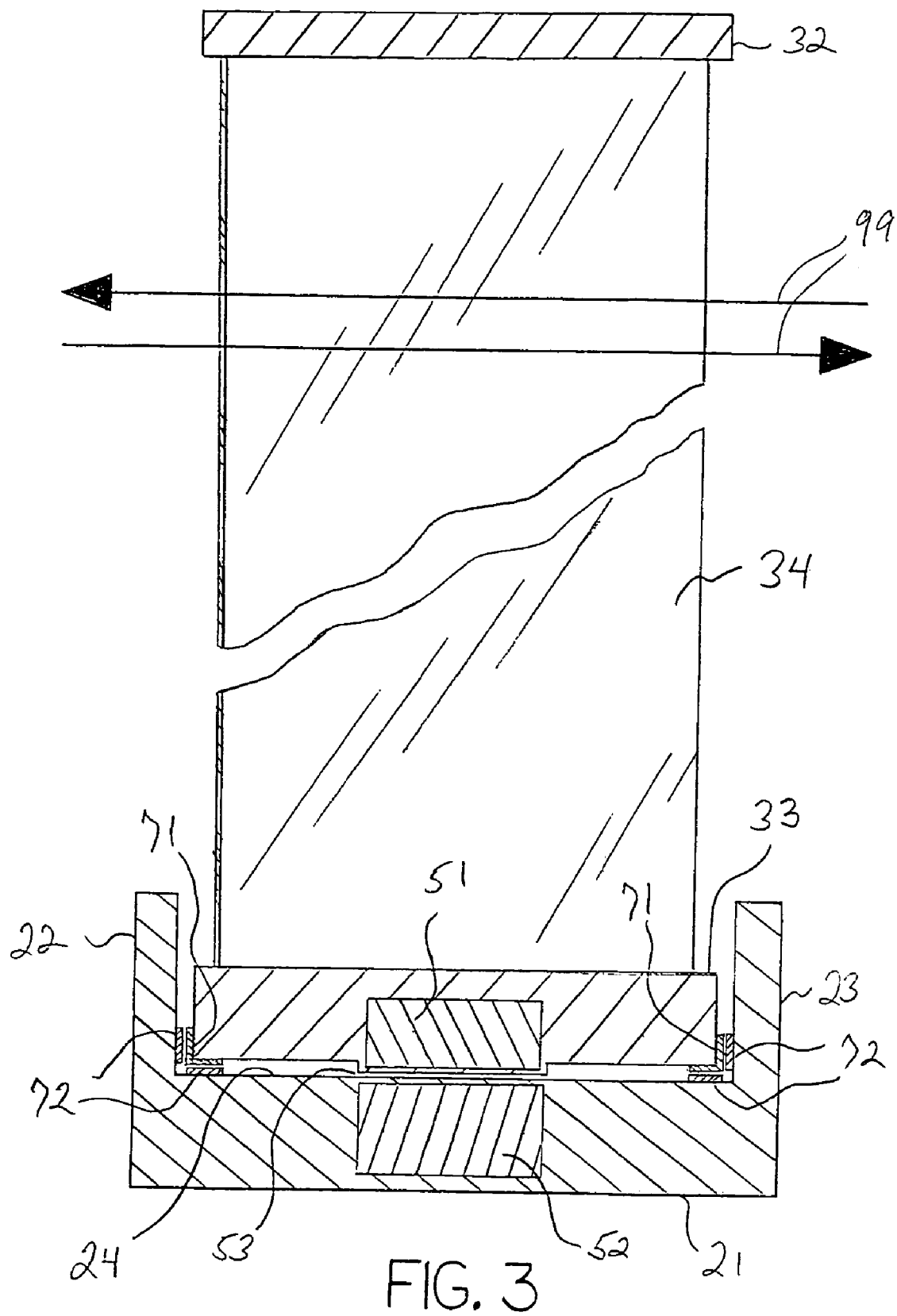
FIG. 3 is a partial cross-sectional view of the preferred embodiment, showing journals and marine bearing plates comprising the anti-friction means.

With reference to the drawings, the invention will now be described in detail with regard for the best mode and the preferred embodiment. In a most general sense, the invention is both a device for producing electricity, referred to generally as a hydroelectric turbine or power plant, and a method for producing electricity from low head bidirectional or reversing water flow, particularly and primarily bidirectional water flow resulting from tidal flow, i.e., the cycling movement of water between high tide and low tide conditions.

As shown in FIGS. 1 and 2, the invention is an open-centered hydroelectric turbine or power plant 10 comprising a generally annular housing 21. The configuration of housing 21 shown is not meant to be limiting, as other configurations are possible provided the housing 21 accomplishes among other purposes retaining the rotating assembly or rotor 31 against undesired movement in either axial direction, allowing rotation of the rotor 31 about the rotational axis in both directions, and allowing transfer of the rotational energy to generator means 42 or actual participation in the production of electricity. Housing 21 comprises a first retaining flange 22 and a second retaining flange 23 positioned on either side of an interior periphery surface 24 that cooperate to define a retaining means against excessive movement of the rotor 31 in either axial direction, such flanges preferably being annular in nature and each providing a generally planar interior surface facing the rotor 31. Alternatively, the retaining flanges 22 and 23 need not be continuous members.

The rotating assembly or rotor 31 comprises an inner annular rim member 32 and an outer annular rim member 33, the rims 32 and 33 preferably being relatively thin in the direction perpendicular to the central rotation axis. Extending between inner rim 32 and outer rim 33 are a plurality of propellers, runners or blade members 34, the blades 34 being angled or twisted in known manner such that movement of fluid in the axial reversing tidal flow direction 99 results in rotation of the rotor 31. The particular number, configuration and material composition of the blades 33 may vary, but preferably the blades 33 are constructed to be as lightweight as possible without excessively sacrificing structural integrity.

The inner rim 32 defines a relatively large open center 35 that increases the effectiveness of the hydroelectric turbine 10 in low head conditions, since support for the rotor 31 is spread about the periphery of the outer rim 33 rather than being concentrated at a central shaft. This enables the housing 21 and rotor 31 to be constructed with a much larger diameter than possible with shaft mounted rotors, thereby allowing for a dramatic increase in the total surface area of the blade members 34, which enables the hydroelectric turbine 10 to function well in low head conditions.

In the preferred embodiment as shown in FIG. 3, the housing 21 and rotor 31 in combination define a generator for the production of electricity. This is accomplished by locating a plurality of magnets 51 about the outer eriphery of the outer rim 33 and locating a plurality of coils 52 about the inner periphery surface 24 of the housing 21, such that the housing 21 becomes in effect the stator of a generator. The magnets 51 and coils 52 are protected by a thin coating of epoxy or similar material that will not interfere with the electromagnetic operation. Rotation of the rotor 31 passes the magnets 51 across the coils 52 and electricity is produced in known manner. It is important that the gap 53 between the magnets 51 and coils 52 be precisely maintained, this gap 53 being relatively small in comparison to the overall size of the housing 21. It is also important to provide anti-friction means to minimize frictional drag between the rotor 31 and the housing 21 in addition to the lubrication provided by the water itself. In the preferred embodiment, this is accomplished utilizing a combination of journal members 71 and marine bearing plates 72, as shown in FIG. 3. The journals 71 are shown as being mounted at the inflow and outflow edges of the outer rim 33 and the marine bearing plates 72 as being mounted on the interior periphery of the housing 21 and retaining flanges 22 and 23, but the positions could be reversed. The journal 71 is composed of a relatively low friction material, such as stainless steel or the like, and the marine bearing plates 72 are likewise composed of a relatively low friction material, such as a polymer, e.g., Teflon, ceramic or the like. These components, as well as all components in the device, must be resistant to salt water and other environmental damage, as the use of the invention will typically expose the components to such elements, in particular given that tidal flow typically comprises salt water or brackish water. The journals 71 and marine bearing plates 72 in combination reduce friction and drag in the radial direction and both axial directions, such that rotation of the rotor 31 relative to the housing 21 is minimally impeded.

Figure 4:
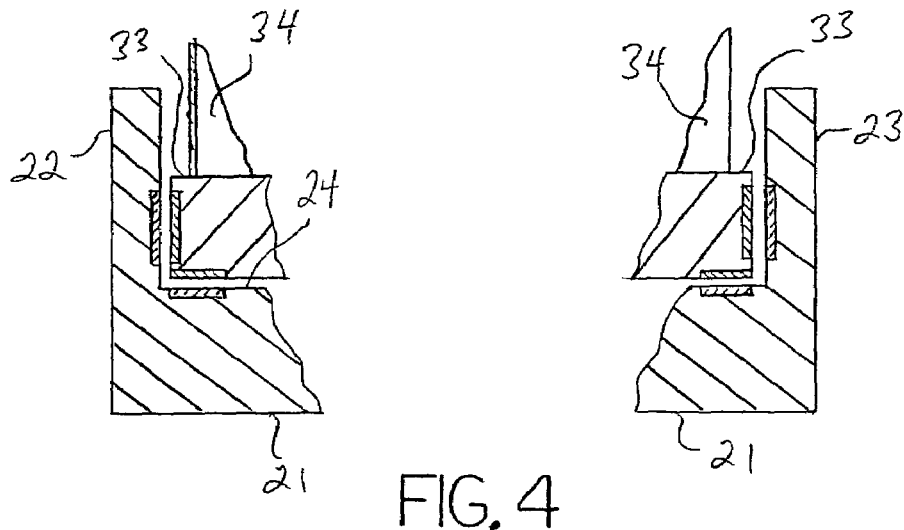
FIG. 4 is an alternative embodiment shown similarly to FIG. 3, wherein the anti-friction means comprises repelling magnets.
Figure 5:
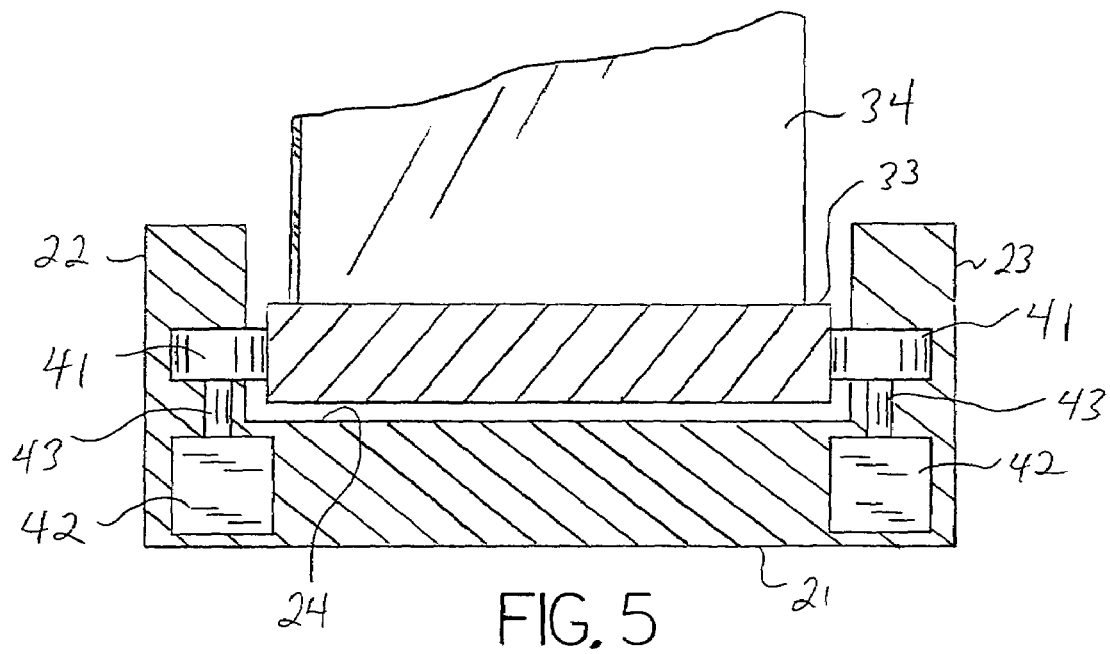
FIG. 5 is an alternative embodiment shown similarly to FIG. 3, where the anti-friction means comprises drive wheels transferring rotational energy to generators.

Alternatively, the anti-friction means may comprise sets of repulsing magnets 61 as shown in FIG. 4. The repulsing magnets 61 are mounted in pairs on the outer rim 33 and the interior periphery surface 24 of housing 21 and retaining flanges 22 and 23 with opposite poles facing each other within a given set, such that the repulsive magnetic force prevents contact between the outer rim 33 and the housing 21 and retaining flanges 22 and 23. In still another alternative embodiment, as shown in FIG. 5, mechanical means may be utilized as the anti-friction means—for example, rollers or other rotating bearings. In the embodiment shown, the anti-friction means comprise drive wheels 41 that are connected by shafts 43 to generator means 42, the rotation of the rotor 31 being directly transferred to the generator means 42 to produce electricity. This final embodiment is the least desirable, as it will be difficult to properly seal these components against fouling and degradation over time.

To produce electricity from tidal flow, one of more hydroelectric turbines 10 are positioned submerged or within the body of water subject to tidal influences, preferably in open water, such that water will flow in one direction through the rotor 31 during rising or incoming tides and further that water will flow through the rotor 31 in the opposite direction during falling or outgoing tides. As the tide rises, the rotor 31 is turned in a first direction and electricity is generated as described. As the tide falls, the flow of water reverses and the rotor 31 is turned in the opposite direction, again generating electricity. Because of the open-center construction, the relatively large blade surface area and the dispersal of the supporting forces for the rotor 31 relative to the housing 21 and retaining flanges 22 and 23, the rotor 31 can be rotated in low head conditions, such that tidal flow is sufficient to produce electricity.

It is to be understood that equivalents and substitutions for certain elements set forth above may be obvious to those skilled in the art, and therefore the true scope and definition of the invention is to be as et forth in the following claims.

I claim:

1. An open-center turbine, said turbine producing electricity from bi-directional water flow in a first water flow direction and an opposite second water flow direction without reversing the position of said turbine relative to the water flow direction, comprising:

a rotor comprising blades extending from an outer rim to an inner rim, said inner rim defining an open center, said rotor capable of rotating in a first rotation direction and a second rotation direction;

a housing comprising retaining means to retain said rotor and to prevent excessive movement of said rotor in either of the directions of said bi-directional water flow;

means to generate electricity as a result of rotation of said rotor in either said first rotation direction or said second rotation direction.

2. The turbine of claim 1, said retaining means comprising a first retaining flange and a second retaining flange.

3. The turbine of claim 2, further comprising anti-friction means to minimize frictional drag between said housing and said rotor.

4. The turbine of claim 3, wherein said anti-friction means minimizes drag between said first retaining flange and said outer rim and between said second retaining flange and said outer rim.

5. The turbine of claim 4, wherein said anti-friction means comprise journals and marine bearing plates.

6. The turbine of claim 5, wherein said journals are composed of stainless steel and said marine bearing plates are composed of a low-friction polymer.

7. The turbine of claim 5, wherein said journals are positioned on said outer rim and said marine bearing plates are positioned on said first and on said second retaining flanges.

8. The turbine of claim 7, said housing further comprising an interior periphery surface, wherein said marine bearing plates are also positioned on said interior periphery surface.

9. The turbine of claim 4, wherein said anti-friction means comprise sets of repulsive magnets mounted on said outer rim and on said first and said second retaining flanges, whereby magnetic repulsion between magnets on said outer rim magnets and said magnets on said first retaining flange and said second retaining flange minimizes frictional drag.

10. The turbine of claim 4, wherein said anti-friction means comprise drive wheels mounted in said housing and contacting said outer rim.

11. The turbine of claim 10, wherein said drive wheels are mounted in both said first retaining flange and in said second retaining flange.

12. The turbine of claim 11, said means to generate electricity comprising a plurality of generator means, and wherein said drive wheels are connected to said generator means.

13. The turbine of claim 6, said housing further comprising an interior periphery surface, wherein said means to generate electricity comprises magnets disposed in said outer rim and coils disposed in said interior periphery surface.

14. The turbine of claim 8, wherein said means to generate electricity comprises magnets disposed in said outer rim and coils disposed in said interior periphery surface.

* * * * *